(12) United States Patent
Kayal et al.

(10) Patent No.: US 11,027,922 B1
(45) Date of Patent: Jun. 8, 2021

(54) BUFFER CARTS WITH ARTICULATING FLOORS

(71) Applicant: Amazon Technologies, Inc., Seattle, WA (US)

(72) Inventors: Khalid Kayal, Seattle, WA (US); Raashid Mohammed, Lynwood, WA (US); Jay Dugat, Cypress, TX (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 16/431,244

(22) Filed: Jun. 4, 2019

(51) Int. Cl.
*B65G 1/137* (2006.01)
*B65G 1/04* (2006.01)

(52) U.S. Cl.
CPC ......... *B65G 1/1375* (2013.01); *B65G 1/0492* (2013.01)

(58) Field of Classification Search
CPC combination set(s) only.
See application file for complete search history.

(56) References Cited

U.S. PATENT DOCUMENTS

| 8,534,034 B1 * | 9/2013 | Pape ............... B65B 43/42 53/473 |
| D907,516 S * | 1/2021 | Siminoff ............ D10/106.5 |
| 2020/0299063 A1 * | 9/2020 | Zhang .............. B65G 1/0492 |

* cited by examiner

*Primary Examiner* — Kyle O Logan
(74) *Attorney, Agent, or Firm* — Eversheds Sutherland (US) LLP

(57) ABSTRACT

Systems, methods, and computer-readable media are disclosed for buffer carts having articulating floors. In one embodiment, an example cart may include a front wall, and a first floor portion coupled to the front wall. The first floor portion may include a slot along a lateral side of the first floor portion. The cart may include a second floor portion, where the second floor portion is coupled to the first floor portion. The cart may include a scissor mechanism coupled to the second floor portion, and a drive system coupled to the scissor mechanism and configured to drive the scissor mechanism in a vertical direction, wherein movement of the scissor mechanism includes relative motion between the first floor portion and the second floor portion via the slot.

20 Claims, 9 Drawing Sheets

BUFFER CARTS WITH ARTICULATING FLOORS

BACKGROUND

Carts may be used to for multiple purposes, such as storing items or transporting items from one location to another. Carts may have various dimensions, such as different heights and widths, as well as different functionality, such as whether or not the cart can be closed, whether or not the cart can be manually moved, and so forth. In some instances, carts may be used to store items. To access items from such carts, users may have to reach into the cart. Depending on the depth of the cart, such actions may present a risk of injury to the user. In addition, accessing items at or near a bottom of the cart may be difficult or time consuming. Accordingly, carts that reduce such risks may be desired.

Figure 1:
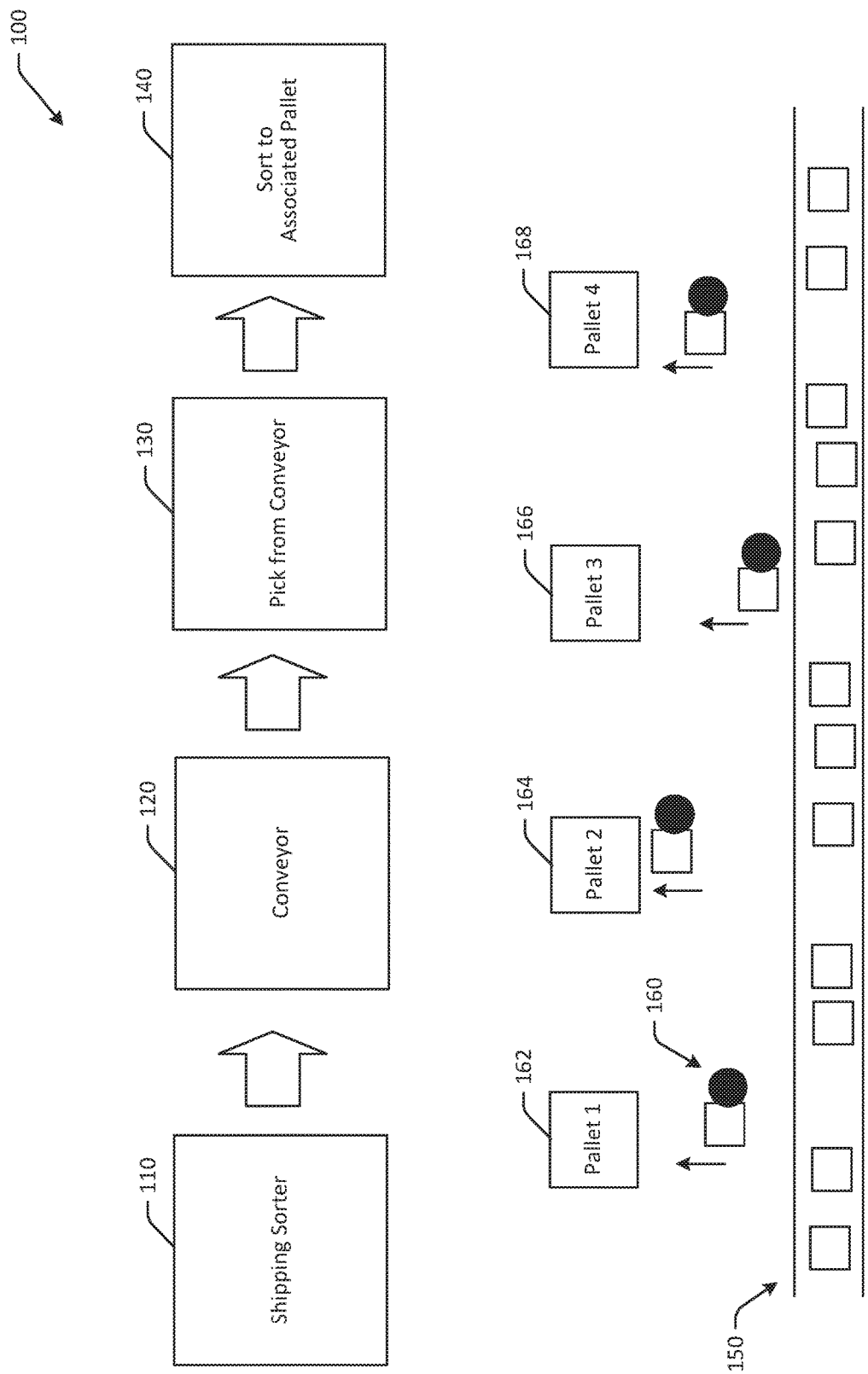
FIG. 1 is a hybrid schematic illustration of an example process flow for palletization of packages and an example schematic illustration of a palletization process.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, after products are packed into packages, the packages may be sorted by various attributes, such as a general destination location or region, destination zip code, a designated third-party shipping provider, and/or other attributes. For example, packages may be sorted using labels affixed to the packages. Packages that are destined for similar locations, such as the same state or country, may be sorted into a first area, whereas packages destined for other locations may be sorted into a second area. Sorting may be automated using scanners or other equipment, manual by operators, or a combination thereof. In some instances, as packages are being sorted, the packages may be aggregated on a pallet for subsequent shipping. A pallet may be a portable platform on which goods can be stored. Pallets may be optionally wrapped and moved using manual or mechanical equipment, such as a forklift. Packages on a pallet may be sorted into the same category, which may be a destination-based category or any other suitable category. Once a pallet is full, the pallet may be loaded into a shipping container, onto a truck, or otherwise shipped to a subsequent destination. The subsequent destination may be a waypoint, a final destination, or a different destination. In some instances, the pallet may be "broken down," in that packages may be removed from the pallet and then resorted at a different sorting center using the same or different criteria. For example, a package destined for Seattle from Miami may be placed on a pallet bound for Atlanta, where the pallet may be broken down and the package may subsequently be placed on another pallet bound for Seattle. In other instances, the pallet may remain intact until reaching a local delivery station.

To build or form pallets, in some instances, operators may manually retrieve packages, such as from a conveyor belt, and place the packages on a pallet. When the pallet is complete, the operator may optionally wrap the pallet and send the pallet to a loading station for loading into a truck or shipping container. However, such manual operation may be time consuming and may increase a risk of injury to operators, as packages may be of non-uniform size or weight, and a distance between a conveyor belt and a pallet may be relatively long.

Embodiments of the disclosure include buffer carts with articulating floors that may reduce a risk of injury to operators, reduce an amount of time spent placing packages on pallets, reduce a distance that operators may have to travel with packages, and/or may increase efficiency of packages that are sorted and/or palletized. Palletization may refer to the process of placing packages from the buffer carts onto pallets. Certain embodiments may include articulating floors that optimally position packages for pick up or retrieval by operators, and that prevent overflow of packages from falling out of the buffer cart. Some embodiments may include sensors, such as cameras, photo sensors, or other sensors, that may be used to automatically adjust a positioning of an articulating floor of the buffer cart. Some embodiments may include a power articulated lift to hold packages as a buffer. The lift may be used to prevent packages from getting damaged as they are diverted to the cart, such as from a conveyor. Some embodiments may determine when the buffer cart has a certain amount of packages ready to be palletized, and may trigger a signal to an operators to initiate the palletization process by picking the packages from the cart and loading them onto a pallet. As a result, operator workload may be reduced, throughput of fulfillment centers may be improved, and/or logistics of fulfillment center operations may be less complicated.

Referring to FIG. 1, an example use case 100 of a sorting area at a fulfillment center or other location, and an example process flow, is depicted. Although discussed in the context of packages, other embodiments may be directed to any suitable use case where items or other objects are sorted.

In FIG. 1, a fulfillment center may include a shipping sorter 110 and a conveyor system 120. The shipping sorter 110 may include various materials handling equipment configured to divert or otherwise guide packages to certain locations. For example, the shipping sorter 110 may induct packages, determine a designated location to sort respective packages, and may direct the packages to the designated location using any combination of materials handling equipment, such as conveyors, belts, mechanical arms, and/or other components. The shipping sorter 110 may include one or more scanners to identify packages and/or destinations associated with packages.

Packages may be diverted from the shipping sorter 110 to one or more conveyors of the conveyor system 120. The conveyors may be used to guide packages to a palletization area, where operators may retrieve the packages from the conveyor. Packages destined for one or more pallets may be sent down the same conveyor.

At operation 130, an operator may pick packages from the conveyor, and at operation 140, the operator may sort the package to an associated pallet. For example, the operator may manually scan the package and may determine which pallet the package is associated with, as different pallets may be headed to different locations. The operator may then place the package on the associated pallet.

In FIG. 1, an example use case of a conveyor 150 is illustrated, with an operator 160 retrieving packages from the conveyor 150 and placing the package on an associated pallet, such as a first pallet 162. In some instances, such as that illustrated in FIG. 1, there may be multiple pallets, such as a second pallet 164, a third pallet 166, a fourth pallet 168, and so forth, and more than one operator moving packages between the conveyor 150 and the associated pallets.

A distance between the pallets and the conveyor 150 may be relatively long, resulting in increased manual effort by the operator 160 when handling and moving packages. In addition, manual scanning of packages may increase the amount of time it takes for the operator to determine an associated pallet. As a result, the palletization process may be time consuming and/or cumbersome.

Figure 2:
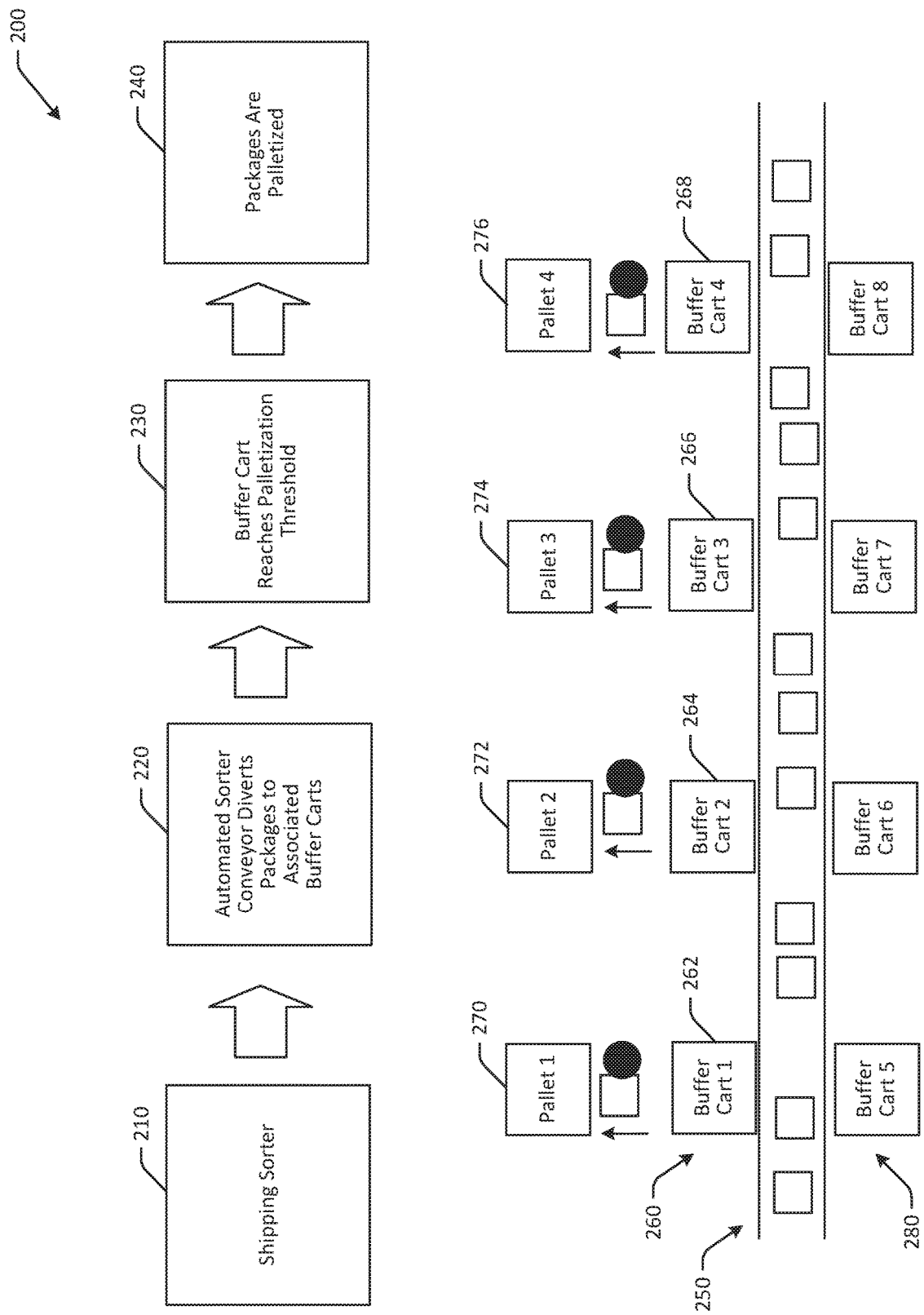
FIG. 2 is a hybrid schematic illustration of an example process flow for palletization of packages with buffer carts and an example schematic illustration of a palletization process with buffer carts having articulating floors in accordance with one or more embodiments of the disclosure.

FIG. 2 is a hybrid schematic illustration of a use case 200 for a palletization process with buffer carts having articulating floors and an example process flow for palletization of packages with buffer carts in accordance with one or more embodiments of the disclosure. Other embodiments may include additional or fewer components. Although discussed in the context of packages, other embodiments may be directed to any suitable use case where items or other objects are sorted.

In FIG. 2, a fulfillment center may include a shipping sorter 210 and an automated sorter conveyor system 220. The shipping sorter 210 may include various materials handling equipment configured to divert or otherwise guide packages to certain locations. For example, the shipping sorter 210 may induct packages, determine a designated location to sort respective packages, and may direct the packages to the designated location using any combination of materials handling equipment, such as conveyors, belts, mechanical arms, and/or other components. The shipping sorter 210 may include one or more scanners to identify packages and/or destinations associated with packages.

Packages may be diverted from the shipping sorter 210 to the automated sorter conveyor system 220. The automated sorter conveyor system 220 may be configured to divert packages to associated buffer carts. The embodiment illustrated in FIG. 2 may include a number of buffer carts, where packages may be held, or buffered, until a certain threshold of packages is stored in the buffer cart, and the packages may be palletized. Packages may be associated with certain buffer carts based at least in part on a package destination and/or pallet associated with the respective buffer cart. The automated sorter conveyor system 220 may include one or more conveyors that may be used to guide packages to predetermined buffer carts. The packages may be guided into the respective buffer carts using chutes or any other suitable mechanism.

At operation 230, the buffer cart may reach a palletization threshold. A palletization threshold may be indicative of when the buffer cart is at capacity and/or the buffer cart has a number of packages sufficient to be moved to a pallet. The buffer cart may automatically determine when the palletization threshold is met using, for example, photo sensors at different locations within the buffer cart, a camera system to determine a level of fullness of the buffer cart, one or more weight sensors, or any other suitable hardware or software. At operation 240, the packages may be palletized. For example, an operator may pick packages from the buffer cart and place the packages on an associated pallet. Because the packages may be presorted by the automated sorter conveyor system 220, the operator may not have to sort the package, as all the packages in the buffer cart may be designated for the same pallet in some instances. In addition, the distance between the buffer cart and the associated pallet may be relatively less than the distance between the conveyor and pallet illustrated in FIG. 1, and as a result, an amount of manual effort exerted by operators may be reduced due to a reduced distance and time of handling packages. Operators may place the packages on the pallet, and as described herein, as packages are removed from the buffer cart, an articulating floor of the buffer cart may raise packages from a lower portion of the buffer cart to an upper portion, such that the operator does not have to reach down into the buffer cart. While packages are being removed from the buffer cart, the automated sorter conveyor system 220 may suspend diversion of packages to the buffer cart, so as to avoid any potential injury or breakage of packages.

In FIG. 2, an example use case of a conveyor 250 (which may be part of the automated sorter conveyor system 220) is illustrated, with buffer carts 260 placed adjacent to the conveyor 250 on one or more sides. For example, a first buffer cart 262, a second buffer cart 264, a third buffer cart 266, and a fourth buffer cart 268 may be positioned on a first side of the conveyor 250, and a second set of buffer carts 280 may be positioned on a second side of the conveyor 250. Any number of buffer carts may be included and may be placed on one or more sides of the conveyor 250. The conveyor 250 may include equipment to automatically divert packages into the respective buffer carts.

The buffer carts 260 may be positioned adjacent to pallets. For example, the first buffer cart 262 may be adjacent to a first pallet 270, the second buffer cart 264 may be adjacent to a second pallet 272, the third buffer cart 266 may be adjacent to a third pallet 274, and the fourth buffer cart 268 may be adjacent to a fourth pallet 276. More than one pallet may be associated with a buffer cart in some embodiments.

As illustrated in the example of FIG. 2, a distance between the pallets and the buffer carts 260 may be relatively short, resulting in decreased manual effort by operators when handling and moving packages. In addition, automated scanning and sortation of packages may decrease the amount of time it takes for the operator to move packages from the buffer carts to the associated pallet.

As a result, the palletization process of FIG. 2 may be significantly faster and easier than that of FIG. 1, with additional benefits of reduced manual effort, increased safety for operators, and improved throughput of packages. In addition, certain buffer carts may have a greater package capacity than pallets, and the palletization process may therefore be simplified because the buffer cart can fill an entire pallet with packages, and operators may not have to return to place packages on the pallet multiple times. Moreover, unlike in the instance of FIG. 1, because operators may not have to sort and scan packages manually, and because of the reduced amount of walking by operators, the embodiment of FIG. 2 may result in an increase of palletization rate of about three times the palletization rate of FIG. 1. For example, in FIG. 1, an average palletization rate may be 120 packages per hour per operator, where in FIG. 2, an average palletization rate may be 430 packages per hour per operator. Buffer carts may include additional functionality and features, as described herein.

Figure 3:
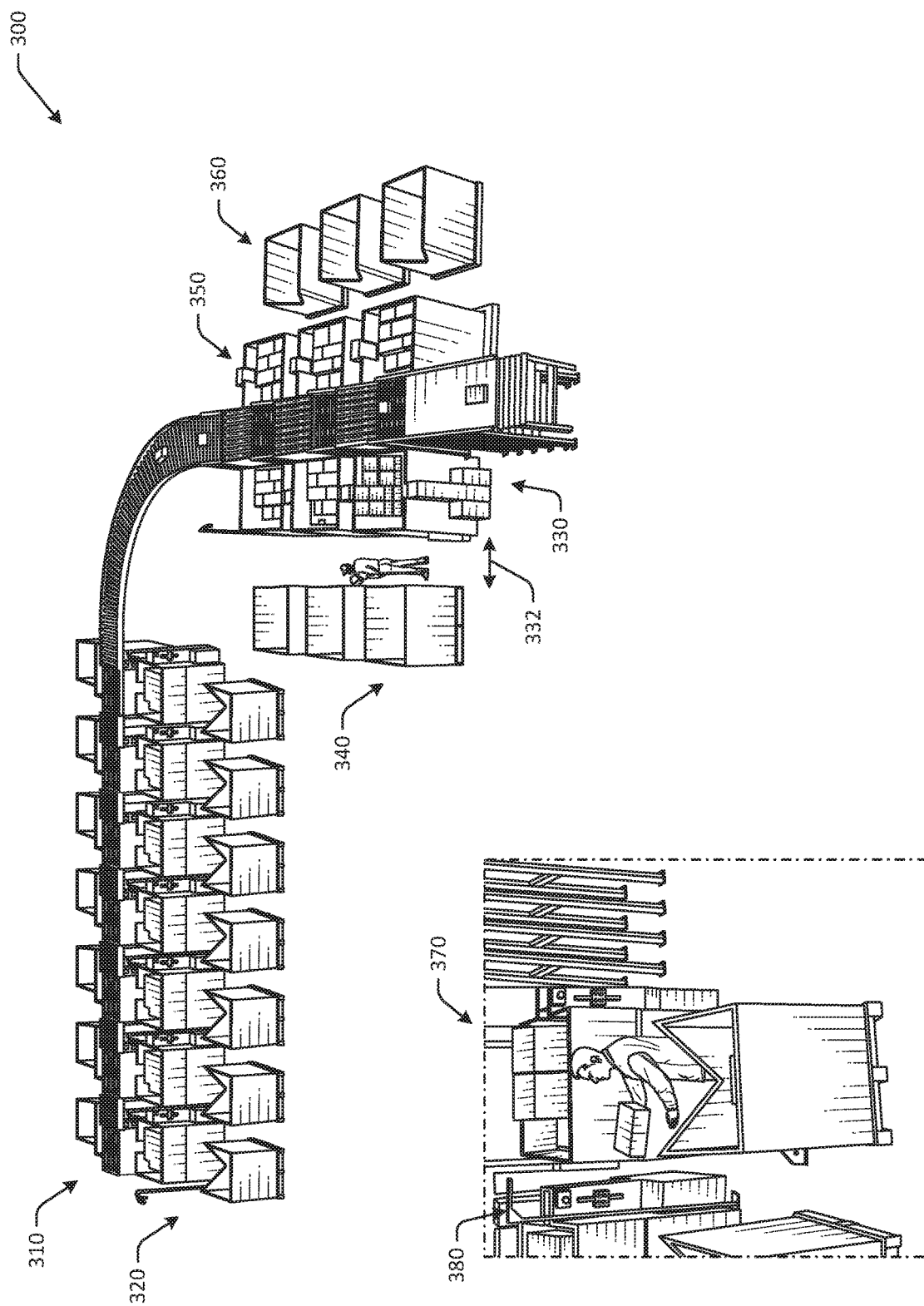
FIG. 3 is a schematic illustration of a system with buffer carts having articulating floors in accordance with one or more embodiments of the disclosure.

FIG. 3 is a schematic illustration of a system 300 with buffer carts having articulating floors in accordance with one or more embodiments of the disclosure. Other embodiments may include additional or fewer components. Although discussed in the context of packages, other embodiments may be directed to any suitable use case where items or other objects are sorted.

In FIG. 3, the system 300 may include an automated sorter conveyor 310, scanners 320, and buffer carts 330. The automated sorter conveyor 310 may be configured to divert packages to the respective buffer cart that is associated with the respective package. The scanners 320 may be machine-readable label scanners and may be positioned overhead, so as to automatically scan packages are they are palletized (e.g., removed from the buffer carts and placed on pallets, etc.). The buffer carts 330 may be positioned on a first side of the automated sorter conveyor 310, and pallets 340 may be positioned adjacent to the respective buffer carts 330. The system 300 may optionally include buffer carts 350 positioned on a different side of the automated sorter conveyor 310. In such instances, pallets 360 may be positioned adjacent to the buffer carts 350. A distance 332 between the buffer carts 330 and the pallets 340 may be relatively short, and may be less than a distance between the automated sorter conveyor 310 and the pallets 340.

As illustrated in the detail view 370 in FIG. 3, an operator may use overhead scanner 380 to seamlessly scan a package as the operator moves the package from a buffer cart to a pallet. The scanning may be used to generate a tracking event or other data log associated with shipment of the package. The overhead scanner 380 may be configured to scan machine-readable labels at long range distances, such as distances of between about two feet to about 6 feet, or more.

In FIG. 3, incoming packages may be scanned and automatically diverted to a predetermined buffer cart. The buffer cart may buffer the packages until the amount of packages to be palletized is reached, or the palletization threshold is satisfied. The buffer cart may trigger a signal to an operator to initiate palletization. The signal may be an audio or visual signal.

Embodiments of the disclosure include buffer carts having articulating floors. Certain embodiments may improve processing speed and/or throughput of fulfillment or sortation centers. Certain embodiments may improve performance of mechanical equipment for sortation and/or consolidation of packages or items for palletization. While described in the context of packages, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment or sortation centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 4:
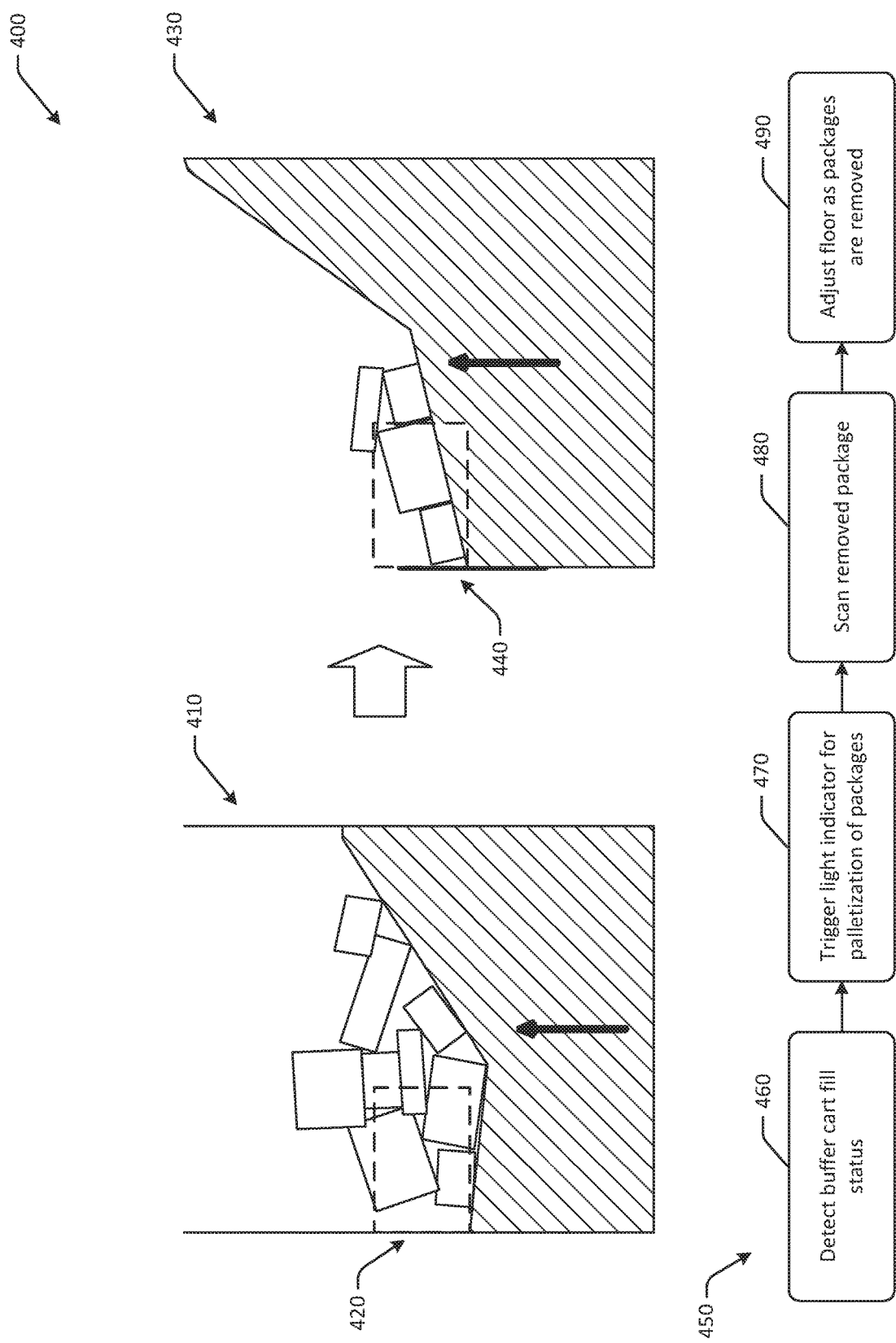
FIG. 4 is a hybrid schematic illustration of a buffer cart with an articulating floor in various positions and an example process flow in accordance with one or more embodiments of the disclosure.

FIG. 4 is a hybrid schematic illustration of a buffer cart 400 with an articulating floor in various positions and an example process flow in accordance with one or more embodiments of the disclosure. Other embodiments may include additional or fewer components. The illustration of FIG. 4 may not be to scale, and may not be illustrated to scale with respect to other figures. The buffer cart illustrated in FIG. 4 may be the same buffer cart discussed with respect to FIGS. 1-3.

In FIG. 4, the buffer cart 400 may include an articulating floor. The articulating floor may include one or more portions, such as two portions, that may be configured to move dependently or independently with respect to each other. The articulating floor may be configured to move downwards as packages are loaded or sorted into the buffer cart 400 (thereby reducing a distance the package "falls" into the buffer cart 400), and may be configured to move upwards as packages are removed from the buffer cart 400, such as during palletization. The articulating floor may be configured to position packages in an optimal zone 420, which may be a zone in which an operator can easily retrieve packages from the buffer cart without having to stretch or reach too far into the buffer cart, and also reduces a need for packages to be lifted by operators. The optimal zone 420 may be adjacent to an access door 440 of the buffer cart 400, and may have a depth into the buffer cart of about 10" to about 18" in some instances. The articulating floor may therefore reduce or remove the need for operators to reach into the buffer cart, and may reduce or eliminate hard-to-reach packages by providing a slope that guides packages at the back of the buffer cart 400 towards the optimal zone 420.

As illustrated in FIG. 4, at a first instance 410, the articulating floor of the buffer cart 400 may be in a first position, whereas at a second instance 430, as packages are removed from the buffer cart 400, the articulating floor may be in a second position. The second position may be higher than the first position, relative to the ground. Accordingly, operators may obtain packages from the buffer cart 400 without having to reach deep into the buffer cart.

Operation of the articulating floor may be automatically controlled by the buffer cart 400 or a remote computer system. For example, based at least in part on feedback from one or more sensors indicative of a level of fullness, or an amount of occupied capacity of the buffer cart 400, the articulating floor may be continuously or periodically adjusted to various positions. Operation of the articulation floor is described in detail with respect to FIGS. 5-8.

An example process flow 450 illustrated in FIG. 4 may be implemented by the buffer cart 400 and/or an associated computer system. At a first block 460, the buffer cart 400 may detect a buffer cart fill status. The fill status may be determined using one or more photo eyes or other sensors. At a second block 470, the buffer cart 400 may trigger a light or other audio/visual indicator for palletization of packages. For example, the buffer cart 400 may determine that a palletization threshold is satisfied, and may therefore trigger a signal to an operator to initiate palletization. At a third block 480, the buffer cart 400 or a related computer system may scan a removed package, or a package that was removed from the buffer cart 400. At a fourth block 490, the buffer cart 400 may adjust the articulating floor as packages are removed from the buffer cart 400, with a goal of placing at least some packages within the optimal zone 420.

In the example of FIG. 4, the articulating floor may include a first floor portion and a second floor portion that is angled with respect to the first floor portion. The buffer cart 400 may be configured to move the articulating floor positioning of the first floor portion and the second floor portion so as to cause packages in the buffer cart 400 to be positioned within the optimal zone, or a preset distance of the access door 440 as packages are removed from the buffer cart.

Figure 5:
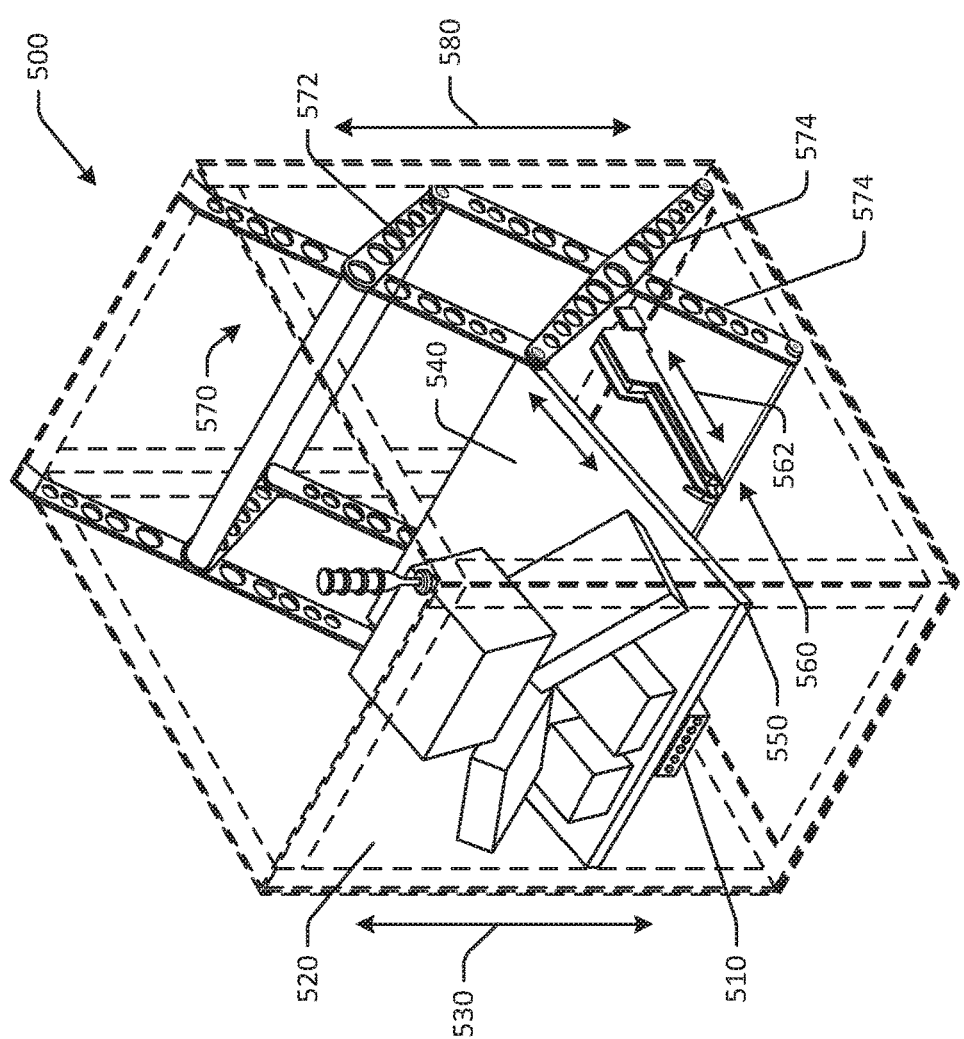
FIG. 5 is a schematic illustration of a perspective view of a buffer cart with an articulating floor in accordance with one or more embodiments of the disclosure.

FIG. 5 is a schematic illustration of a perspective view of a buffer cart 500 with an articulating floor in accordance with one or more embodiments of the disclosure. Other embodiments may include additional or fewer components. The illustration of FIG. 5 may not be to scale, and may not be illustrated to scale with respect to other figures. The buffer cart illustrated in FIG. 5 may be the same buffer cart discussed with respect to FIGS. 1-4.

The buffer cart 500 may include a control panel 510 that may have one or more buttons or other manual input components to control operation of the buffer cart 500. For example, an operator may use the control panel 510 to initiate a palletization mode at the buffer cart 500, where positioning of an articulating floor is automatically determined. In some instances, the control panel 510 may be used to override positioning of the articulating floor or for any other suitable operation.

The buffer cart 500 may include an access door 520 that provides access to the packages or other contents of the buffer cart 500. The access door 520 may be configured to move about a front wall of the buffer cart. For example, in FIG. 5, the access door 520 may be configured to slide vertically along directions 530 to open and close, so as to provide access to the packages in the buffer cart 500. In other embodiments, the access door 520 may rotate or otherwise move with respect to the front wall. When the access door 520 is in an open position, diversion of packages to the buffer cart 500 may be suspended to prevent injury. The access door 520 may be at least partially clear or transparent in some embodiments, so as to allow operators to visualize packages on the other side of the access door 520, and to prevent packages from accidentally falling out of the buffer cart 500 when the access door 520 is opened. In some embodiments, the buffer cart may include one or more scanners, and a set of lights configured to indicate a fullness level of the cart.

The buffer cart 500 may include an articulating floor. The articulating floor may have any number of floor portions. In the embodiment illustrated in FIG. 5, the articulating floor may include a first floor portion 540 and a second floor portion that is not illustrated in FIG. 5, but would be angled with respect to the first floor portion 540 and is coupled to the scissor mechanism in FIG. 5. The second floor portion is not illustrated in FIG. 5 solely to provide a view of the scissor mechanism to which the second floor portion may be coupled.

The first floor portion 540 may be coupled to the front wall of the buffer cart 500 at a coupling point or joint 550. In some embodiments, the first floor portion 540 may pivot about the coupling point or joint 550 of the front wall as the second floor portion moves. The first floor portion 540 may therefore be configured to pivot with respect to the front wall of the buffer cart 500. In other embodiments, the first floor portion 540 may be configured to move vertically with respect to the front wall. The first floor portion 540 may include one or more slots formed along one or more lateral sides of the first floor portion. The slot(s) may be used to couple the first floor portion 540 to the second floor portion, such that movement of the first floor portion 540 is at least partially dependent on movement of the second floor portion. The slot(s) may be formed in the side of the first floor portion 540, or may be formed in rails or other components coupled to the first floor portion 540.

The articulating floor of the buffer cart 500 may include a second floor portion that is coupled to the first floor portion 540. The second floor portion may include protrusions configured to engage the slot(s) of the first floor portion 540. In some embodiments, the protrusions may be disposed on rails or other supports of the second floor portion, while in other embodiments, the protrusions may be disposed along the sides of the second floor portion. The second floor portion may therefore be configured to slide along the slot(s) of the first floor portion 540. The first floor portion 540 and the second floor portion together form the articulating floor, and form an angled ramp for packages. As packages enter the buffer cart 500 from above the back wall, the packages may slide down the second floor portion to avoid damage. The sloping second floor portion forces packages to the optimal pick zone The buffer cart 500 may include a scissor mechanism 570. The scissor mechanism 570 may be a scissor lift or another suitable form of members coupled together to generate linear motion. In the example of FIG. 5, the linear motion generated by the scissor mechanism 570 may be in a vertical direction 580. The second floor portion may be coupled to an upper side of the scissor mechanism 570. The scissor mechanism 570 may be configured to move the second floor portion from a first position to a second position, such as from a first vertical position to a second vertical position. The scissor mechanism 570 may include a number of members. For example, the scissor mechanism 570 may include a set of members 574 forming an 'X' and another member 572 configured to support a middle of the second floor portion from underneath. The scissor mechanism 570 may manipulate a position of the second floor portion by changing a distance between the set of members 574 along a base of the buffer cart 500.

The buffer cart 500 may include a drive system 560 that is configured to change a position of the scissor mechanism 570. In some embodiments, the drive system 560 may be part of the scissor mechanism, while in other embodiments, the drive system 560 may be part of the buffer cart 500. The drive system 560 may be configured to drive or impart motion on the scissor mechanism 570. The drive system 560 may be any suitable drive system, such as one or more of a hydraulic drive system, a pneumatic drive system, a mechanical drive system (e.g., a stepper motor, jack screw, actuator, etc.), or a different type of drive system. The drive system 560 may be coupled to the set of members 574, and may move along direction 562, as a result changing a distance in between the lower ends of the set of members 574. As the drive system 560 extends, the distance between the lower ends of the set of members 574 may increase, and the second floor portion may move to a lower vertical position. As the drive system 560 contracts, the distance between the lower ends of the set of members 574 may decrease, and the second floor portion may move to a higher vertical position. An angle between the first floor portion 540 and the second floor portion may remain constant as the drive system 560 moves in some embodiments, while in other embodiments, the angle between the first floor portion 540 and the second floor portion may change as the drive system 560 moves. For example, the angle between the first floor portion 540 and the second floor portion may change from about 10 degrees to about 60 degrees in some embodiments.

The drive system 560 may therefore be configured to drive the scissor mechanism 570 downwards as packages are placed into the buffer cart 500, and upwards as packages are removed from the buffer cart 500. The drive system 560 may be configured to move from a first lateral position in which the second floor portion is in a first vertical position to a second lateral position in which the second floor portion is in a second vertical position. Because the second floor portion may be coupled to the first floor portion 540, movement of the second floor portion may impart movement to the first floor portion 540. The second floor portion may be in a first location along the slot when the second floor portion is in the first vertical position, and may be in a second location along the slot when the second floor portion is in the second vertical position. In some embodiments, the control panel 510 may include controls configured to manually adjust positioning of the scissor mechanism 570.

Accordingly, positioning of the articulating floor, and in particular the first floor portion 540 and the second floor portion, may cause packages in the buffer cart 500 to be positioned within the optimal zone for retrieval by operators, or within a preset distance of the access door 520 as packages are removed from the buffer cart 500.

Figure 6:
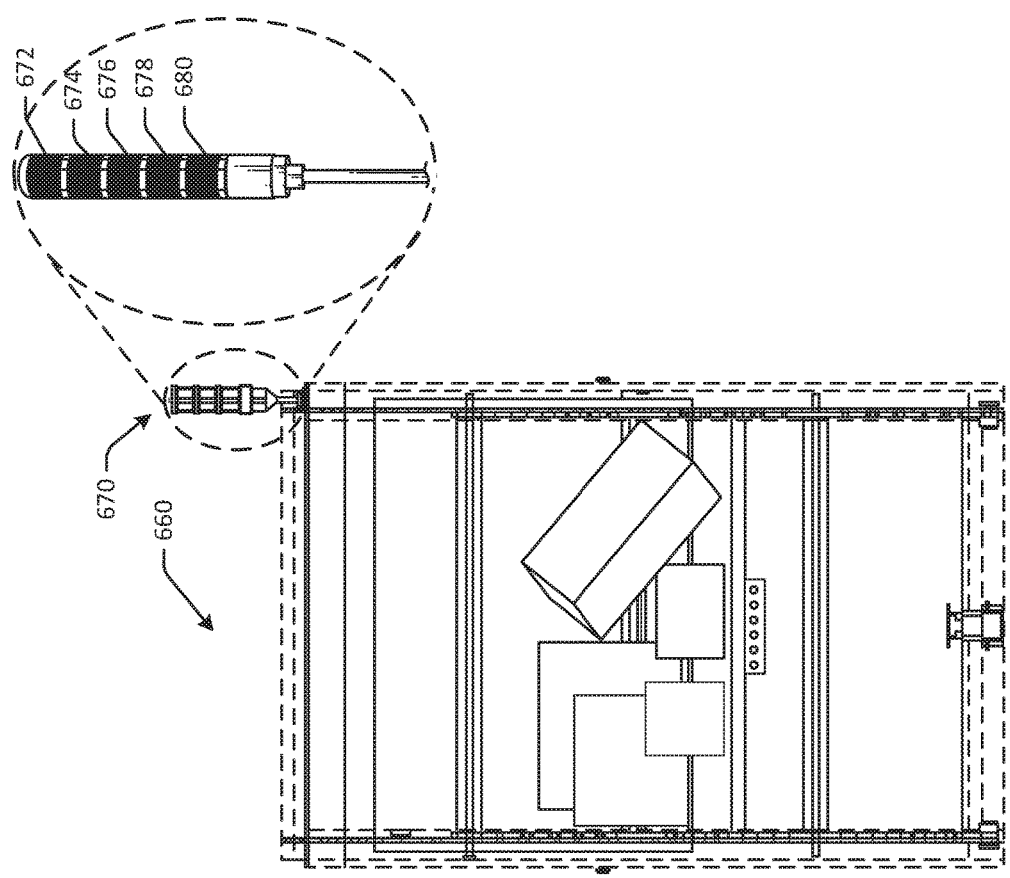
FIG. 6 is a schematic illustration of a front and rear view of a buffer cart with an articulating floor in accordance with one or more embodiments of the disclosure.
Figure 6:
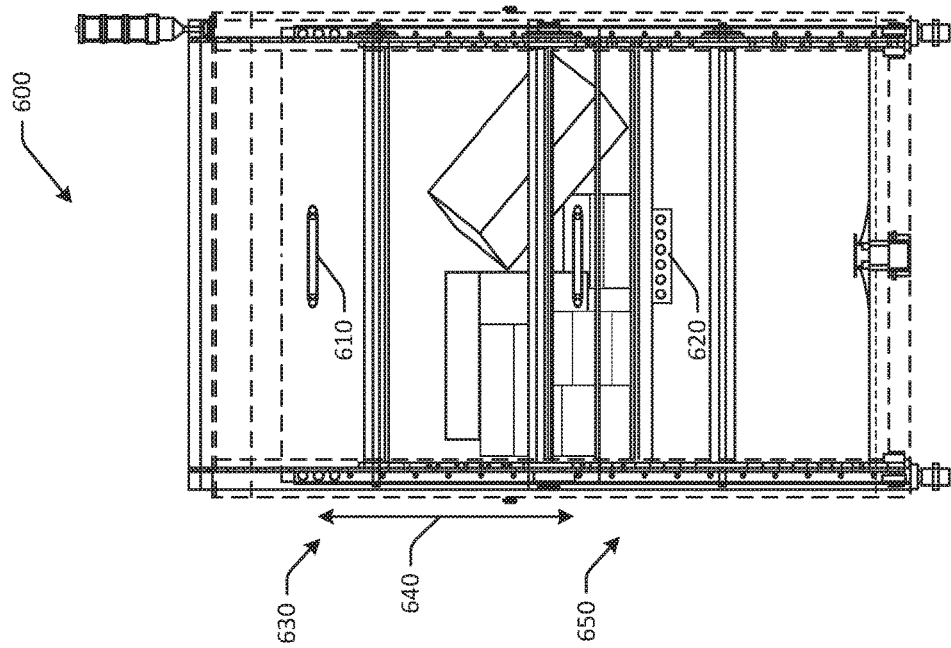

FIG. 6 is a schematic illustration of a front and rear view of a buffer cart 600 with an articulating floor in accordance with one or more embodiments of the disclosure. Other embodiments may include additional or fewer components. The illustration of FIG. 6 may not be to scale, and may not be illustrated to scale with respect to other figures. The buffer cart illustrated in FIG. 6 may be the same buffer cart discussed with respect to FIGS. 1-5.

The buffer cart 600 is depicted in a front view and a rear view 660 in FIG. 6. As illustrated, the buffer cart 600 may include a handle 610 that can be used to move an access door from a closed position 630 to an open position 650 along direction 640. The access door may be manually operated or may be automatically operated using a control panel 620.

The buffer cart 600 may include one or more light indicators 670. As illustrated in detail view in FIG. 6, the light indicators 670 may include any number of lights, such as a first light indicator 672, a second light indicator 674, a third light indicator 676, a fourth light indicator 678, and/or a fifth light indicator 680. The respective light indicators may be used to communicate various information to operators. For example, the first light indicator 672 may be a white light indicator, the second light indicator 674 may be a green light indicator, the third light indicator 676 may be a yellow light indicator, the fourth light indicator 678 may be a red light indicator, and the fifth light indicator 680 may be a blue light indicator. The white light may indicate that the buffer cart 600 is in palletization mode. The green color may indicate that the buffer cart 600 is accepting boxes from the sorter. The yellow color may indicate that the buffer cart 600 is almost reaching the amount of boxes required to build a pallet. The blue light may indicate that the buffer cart 600 is ready to be palletized as it carries enough amount of boxes to build a pallet. The red light may indicate that a jam or an issue with the buffer cart 600 has occurred. Other colors may be used to communicate the same or different information.

The buffer cart 600 may therefore include a power lift and/or scissor mechanism, access door, light indicators 670, palletizing mode button on the control panel 620, and an optional overhead scanner. The buffer cart 600 may be about four feet long, about four feet wide, and about four feet high. The buffer cart 600 may hold up to about 80 or about 100 average packages. The power lift and/or scissor mechanism may be used to prevent boxes from being damaged after diverting. The power lift and/or scissor mechanism may optionally communicate virtually with a scanner, camera system, or photo eye to calculate a cubic volume of a package that is being diverted to the buffer cart 600, and may adjust the articulating floor positioning accordingly. The power lift and/or scissor mechanism may be adjusted manually by an operator for improved box presentation and/or increased ergonomic pick point. The power lift and/or scissor mechanism may be configured to support about 600 pounds or more of weight.

Figure 7:
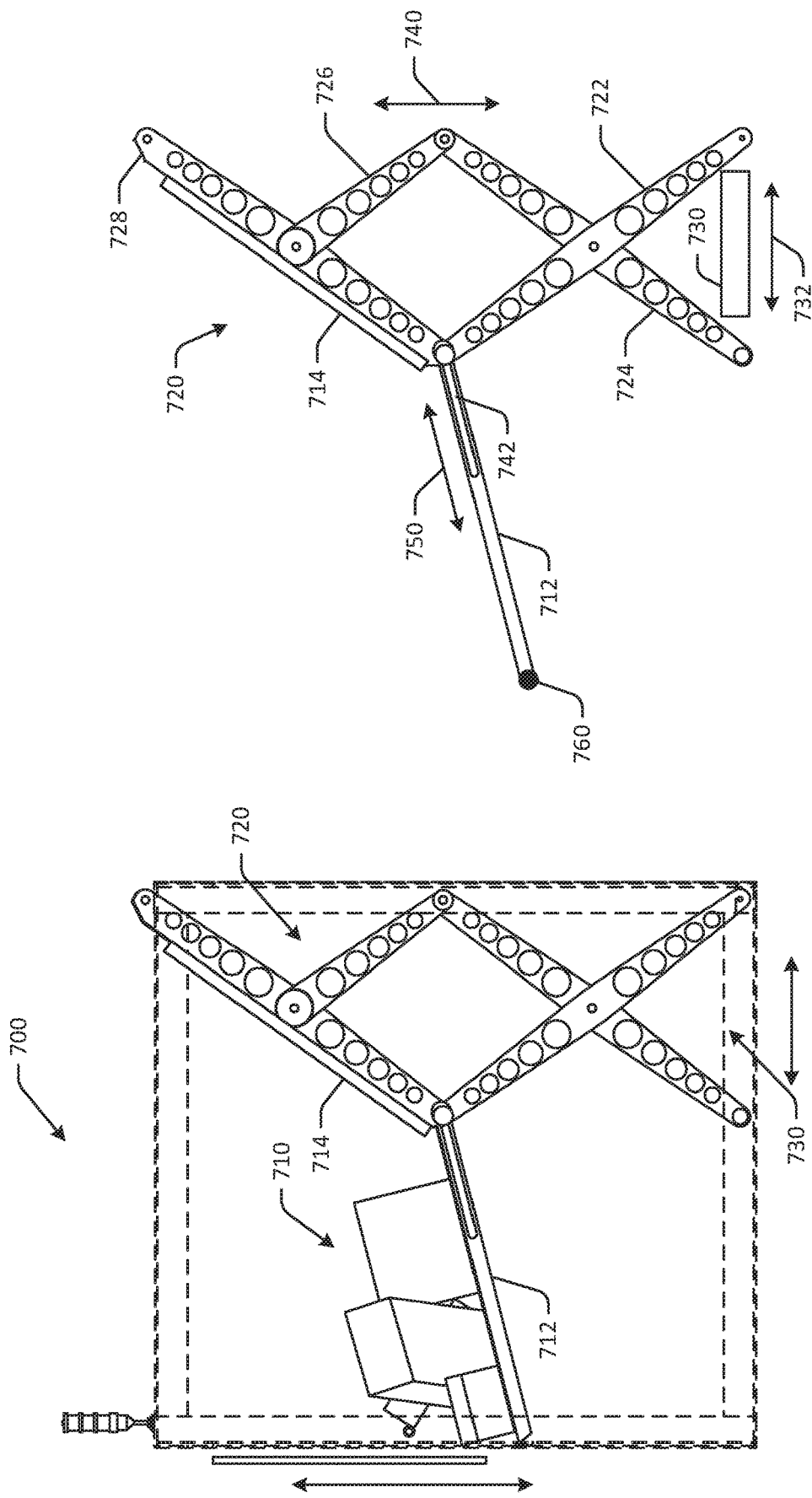
FIG. 7 is a schematic illustration of a side view of a buffer cart with an articulating floor and an isolation view of a scissor mechanism in accordance with one or more embodiments of the disclosure.

FIG. 7 is a schematic illustration of a side view of a buffer cart 700 with an articulating floor and an isolation view of a scissor mechanism in accordance with one or more embodiments of the disclosure. Other embodiments may include additional or fewer components. The illustration of FIG. 7 may not be to scale, and may not be illustrated to scale with respect to other figures. The buffer cart illustrated in FIG. 7 may be the same buffer cart discussed with respect to FIGS. 1-6.

The buffer cart 700 may include an articulating floor 710 having a first floor portion 712 and a second floor portion 714. Any number of floor portions may be included. The first floor portion 712 may be coupled to a front wall of the buffer cart 700. Although the second floor portion 714 is illustrated as being disposed on top of a scissor mechanism member in FIG. 7, in other embodiments, the second floor portion 714 may be coupled to the member along a side surface of the second floor portion 714. The buffer cart 700 may include a scissor mechanism 720 configured to move the articulating floor 710, and a drive system 730, configured to move or drive the scissor mechanism 720.

The scissor mechanism 720, the first floor portion 712, the second floor portion 714, and the drive system 730 are illustrated in isolation view in FIG. 7. The first floor portion 712 may be coupled to a front wall or other component of the buffer cart 700, and may be configured to pivot about a connection 760 between the first floor portion 712 and the buffer cart 700. The first floor portion 712 may include a slot 742 along a lateral side of the first floor portion 712. The first floor portion 712 may include another slot on an opposite lateral side. The slot 742 may be used to engage the second floor portion 714 and/or a component coupled to the second floor portion 714, such as a support member or rail. The second floor portion 714 may be coupled to the first floor portion 712, and may be configured to move along the slot 742. The scissor mechanism 720 may be coupled to the second floor portion 714. The drive system 730 may be coupled to the scissor mechanism 720 and may be configured to drive the scissor mechanism 720 in a vertical direction 740. Movement of the scissor mechanism may include, or may cause directly or indirectly, relative motion between the first floor portion 712 and the second floor portion 714 via the slot 742.

The scissor mechanism 720 may include a first member 722, a second member 724 that is a cross member with respect to the first member 722, a third member 726 coupled to the second member 724, and a fourth member 728 coupled to the first member 722. The first member 722 may have a first end that is coupled to the second floor portion 714 and is configured to move along the slot 742. The first member 722 and/or the second member 724 may be coupled to the drive system 730. The third member 726 may be coupled to a second end of the second member 724 and may configured to support a middle portion of the second floor portion 714. Other embodiments may include a different number of members. The members may have the same or different dimensions. For example, the third member 726 may have a length that is less than the other members. The fourth member 728 may have a greater length than the other members. Other configurations may be used.

As the drive system 730 expands along direction 732, a distance between lower ends of the first member 722 and the second member 724 may increase, and a height of the scissor mechanism may decrease. As the height decreases, the second floor portion 714 may move along the slot 742 towards the front wall of the buffer cart 700 in direction 750. As the drive system 730 contracts along direction 732, a distance between lower ends of the first member 722 and the second member 724 may decrease, and a height of the scissor mechanism may increase. As the height increases, the second floor portion 714 may move along the slot 742 away from the front wall of the buffer cart 700 in direction 750. An angle between the first floor portion 712 and the second floor portion 714 may increase or decrease as the second portion 714 moves along the slot 742.

The scissor mechanism 720 may operates in one or more modes. In a first mode, which may be an accumulation mode, the scissor mechanism 720 may monitor the accumulation of packages and automatically adjust height of the second floor portion 714 to accommodate additional accumulation. If an access door of the buffer cart 700 is opened, the scissor mechanism 720 may operate in a second mode, which may be a palletizing mode. In the second mode, packages may be brought higher using the articulating floor as packages are removed from the buffer cart 700.

The drive system 730 may be configured to drive the scissor mechanism 720 downwards as packages are placed into the buffer cart 700, and upwards as packages are removed from the buffer cart 700.

Figure 8:
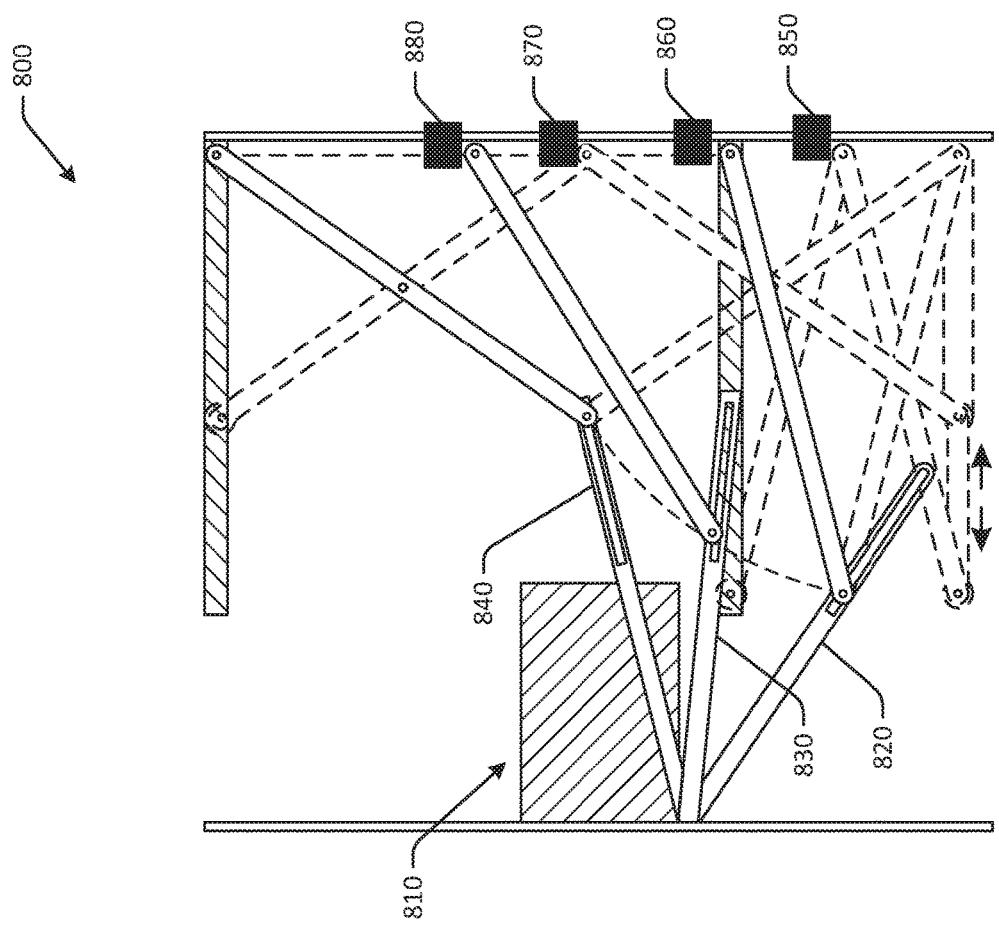
FIG. 8 is a schematic illustration of a side view of a buffer cart with an articulating floor in various positions in accordance with one or more embodiments of the disclosure.

FIG. 8 is a schematic illustration of a side view of a buffer cart 800 with an articulating floor in various positions in accordance with one or more embodiments of the disclosure. Other embodiments may include additional or fewer components. The illustration of FIG. 8 may not be to scale, and may not be illustrated to scale with respect to other figures. The buffer cart illustrated in FIG. 8 may be the same buffer cart discussed with respect to FIGS. 1-7.

The buffer cart 800 may include an articulating floor configured to position packages in an optimal zone 810 for optimal ergonomics and reduced manual effort for removal of packages. The articulating floor may include a first floor surface coupled to a front wall of the buffer cart 800, and a second floor surface coupled to the first floor surface and configured to form a variable angle with respect to the first floor surface. The buffer cart 800 may include a scissor mechanism configured to move the second floor surface in a vertical direction, and a drive system to drive the scissor mechanism.

The buffer cart 800 may use one or more sensors to determine positioning of the articulating floor. For example, in FIG. 8, a number of photo sensors may be used to determine a level of fullness of packages in the buffer cart 400. A first photo sensor 850 may be used to determine a first level of fullness, a second photo sensor 860 may be used to determine a second level of fullness that is greater than the first level of fullness, a third photo sensor 870 may be used to determine a third level of fullness that is greater than the second level of fullness, and a fourth photo sensor 880 may be used to determine a fourth level of fullness that is greater than the third level of fullness. The level of fullness associated with a photo sensor may be determined based at least in part on the physical positioning of the photo sensor in the buffer cart 800. As different photo sensors are triggered, the buffer cart 800 may move the articulating floor to various random or predetermined positions. For example, as packages are removed from the buffer cart, when the fourth photo sensor 880 is triggered, the buffer cart 800 may position the articulating floor at a first position 820. When the third photo sensor 870 is triggered, the buffer cart 800 may position the articulating floor at a second position 830, so as to elevate remaining packages. When the second photo sensor 860 is triggered, the buffer cart 800 may position the articulating floor at a third position 840, so as to elevate remaining packages. Some embodiments may include a first sensor configured to detect a first fullness level of the buffer cart 800, and a second sensor configured to detect a second fullness level of the buffer cart 800. The drive system may be configured to position the scissor mechanism at a first preset position (or a first random position in some embodiments) responsive to a first signal from the first sensor, and at a second preset position (or a second random position in some embodiments) responsive to a second signal from the second sensor. Any number of sensors may be used.

Accordingly, the photo sensors may be used to determine a positioning of the articulating floor. If preset or predetermined floor positions are not used, the buffer cart 800 may continually elevate the articulating floor until a certain photo sensor, such as the fourth photo sensor 880, is triggered.

One or more operations of the methods, process flows, or use cases of FIGS. 1-8 may have been described above as being performed by a user device or controller, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
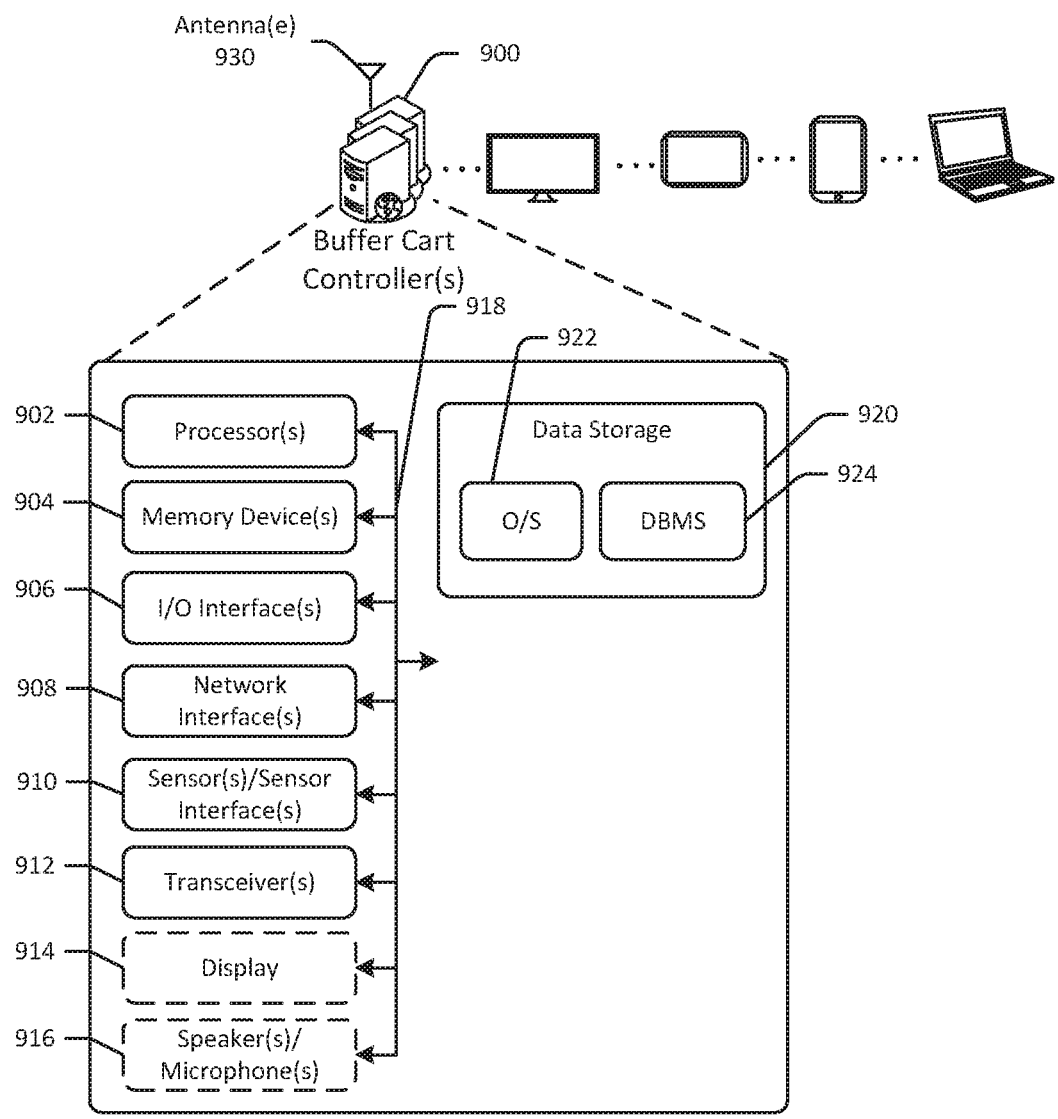
FIG. 9 schematically illustrates an example architecture of a computer system associated with a buffer cart with an articulating floor in accordance with one or more embodiments of the disclosure.

FIG. 9 is a schematic block diagram of one or more illustrative buffer cart controller(s) 900 in accordance with one or more example embodiments of the disclosure. The buffer cart controller(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The buffer cart controller(s) 900 may correspond to an illustrative device configuration for the device(s) of FIGS. 1-8.

The buffer cart controller(s) 900 may be configured to communicate with one or more servers, user devices, or the like. The buffer cart controller(s) 900 may be configured to control operation of various aspects of one or more buffer carts, such as articulating floor operation, lighting indicator operations, and/or other aspects.

The buffer cart controller(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the buffer cart controller(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The buffer cart controller(s) 900 may further include one or more bus(es) 918 that functionally couple various components of the buffer cart controller(s) 900. The buffer cart controller(s) 900 may further include one or more antenna(e) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the buffer cart controller(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the buffer cart controller(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the buffer cart controller(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the buffer cart controller(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the 0/S 922 may be loaded from the data storage 920 into the memory 904 and may provide an interface between other application software executing on the buffer cart controller(s) 900 and the hardware resources of the buffer cart controller(s) 900. More specifically, the 0/S 922 may include a set of computer-executable instructions for managing the hardware resources of the buffer cart controller(s) 900 and for providing common services to other application programs (e.g., managing memory allocation among various application programs). In certain example embodiments, the 0/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the buffer cart controller(s) 900 is a mobile device, the DBMS 924 may be any suitable lightweight DBMS optimized for performance on a mobile device.

Referring now to other illustrative components of the buffer cart controller(s) 900, the input/output (I/O) interface(s) 906 may facilitate the receipt of input information by the buffer cart controller(s) 900 from one or more I/O devices as well as the output of information from the buffer cart controller(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the buffer cart controller(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The buffer cart controller(s) 900 may further include one or more network interface(s) 908 via which the buffer cart controller(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(e) 930 may include any suitable type of antenna depending, for example, on the communications protocols used to transmit or receive signals via the antenna(e) 930. Non-limiting examples of suitable antennae may include directional antennae, non-directional antennae, dipole antennae, folded dipole antennae, patch antennae, multiple-input multiple-output (MIMO) antennae, or the like. The antenna(e) 930 may be communicatively coupled to one or more transceivers 912 or radio components to which or from which signals may be transmitted or received.

As previously described, the antenna(e) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 930 may be configured to transmit or receive radio frequency signals within any suitable frequency range forming part of the unlicensed portion of the radio spectrum.

The antenna(e) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 930—transmitting or receiving radio frequency (RF) signals in the bandwidth and/or channels corresponding to the communications protocols utilized by the buffer cart controller(s) 900 to communicate with other devices. The transceiver(s) 912 may include hardware, software, and/or firmware for modulating, transmitting, or receiving—potentially in cooperation with any of antenna(e) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the buffer cart controller(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s)

or performed by a different module. In addition, various program module(s), script(s), plug-in(s), Application Programming Interface(s) (API(s)), or any other suitable computer-executable code hosted locally on the buffer cart controller(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the buffer cart controller(s) 900 may include alternate and/or additional hardware, software, or firmware components beyond those described or depicted without departing from the scope of the disclosure. More particularly, it should be appreciated that software, firmware, or hardware components depicted as forming part of the buffer cart controller(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-8 may be performed by a device having the illustrative configuration depicted in FIG. 9, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A buffer cart comprising:
a front wall;
an access door configured to slide vertically with respect to the front wall;
a first floor portion coupled to the front wall, the first floor portion comprising a slot formed along a lateral side of the first floor portion, wherein the first floor portion is configured to pivot with respect to the front wall;
a second floor portion coupled to the first floor portion, the second floor portion configured to slide along the slot of the first floor portion, wherein the first floor portion and the second floor portion together form an angled ramp for packages that are associated with a pallet;
a scissor mechanism coupled to the second floor portion and configured to move the second floor portion from a first vertical position to a second vertical position; and
a hydraulic drive system configured to drive the scissor mechanism;
wherein the hydraulic drive system is configured to drive the scissor mechanism downwards as packages are placed into the buffer cart, and upwards as packages are removed from the buffer cart.

2. The buffer cart of claim 1, wherein the hydraulic drive system is configured to move from a first lateral position in which the second floor portion is in the first vertical position to a second lateral position in which the second floor portion is in the second vertical position; and
wherein the second floor portion is in a first location along the slot when the second floor portion is in the first vertical position, and is in a second location along the slot when the second floor portion is in the second vertical position.

3. The buffer cart of claim 1, further comprising:
a first photo sensor configured to detect a first fullness level of the buffer cart; and a second photo sensor configured to detect a second fullness level of the buffer cart;

wherein the drive system is configured to position the scissor mechanism at the first vertical position responsive to a first signal from the first photo sensor, and at the second vertical position responsive to a second signal from the second photo sensor.

4. The buffer cart of claim 1, wherein positioning of the first floor portion and the second floor portion causes packages in the buffer cart to be positioned within a preset distance of the access door as packages are removed from the buffer cart.

5. A cart comprising:
a front wall;
a first floor portion coupled to the front wall, the first floor portion comprising a slot along a lateral side of the first floor portion;
a second floor portion, wherein the second floor portion is coupled to the first floor portion;
a scissor mechanism coupled to the second floor portion; and
a drive system coupled to the scissor mechanism and configured to drive the scissor mechanism in a vertical direction, wherein movement of the scissor mechanism includes relative motion between the first floor portion and the second floor portion via the slot.

6. The cart of claim 5, wherein the drive system is configured to drive the scissor mechanism downwards as packages are placed into the cart, and upwards as packages are removed from the cart.

7. The cart of claim 5, wherein an angle between the first floor portion and the second floor portion changes as the drive system drives the scissor mechanism.

8. The cart of claim 5, wherein the first floor portion is configured to pivot about the front wall as the drive system drives the scissor mechanism.

9. The cart of claim 5, wherein the scissor mechanism comprises:
a first member having a first end that is coupled to the second floor portion and configured to move along the slot;
a second member coupled to the drive system; and
a third member coupled to a second end of the second member and configured to support a middle portion of the second floor portion.

10. The cart of claim 5, further comprising:
a first sensor configured to detect a first fullness level of the cart; and
a second sensor configured to detect a second fullness level of the cart;
wherein the drive system is configured to position the scissor mechanism at a first preset position responsive to a first signal from the first sensor, and at a second preset position responsive to a second signal from the second sensor.

11. The cart of claim 5, wherein the first floor portion is configured to move vertically along the front wall.

12. The cart of claim 5, wherein the drive system comprises at least one of: a hydraulic drive system, a pneumatic drive system, or a mechanical drive system.

13. The cart of claim 5, further comprising:
an access door, wherein the access door is configured to slide vertically with respect to the front wall.

14. The cart of claim 5, further comprising:
a clear access door coupled to the front wall.

15. The cart of claim 5, further comprising:
a scanner configured to read machine-readable labels on packages;
a set of lights configured to indicate a fullness level of the cart; and
a set of controls configured to manually adjust positioning of the scissor mechanism.

16. A cart comprising:
a first floor surface;
a second floor surface coupled to the first floor surface and configured to form a variable angle with respect to the first floor surface;
a scissor mechanism configured to move the second floor surface in a vertical direction; and
a drive system to drive the scissor mechanism.

17. The cart of claim 16, further comprising:
a front wall;
a clear access door configured to slide with respect to the front wall.

18. The cart of claim 16, wherein the drive system is configured to drive the scissor mechanism downwards as packages are placed into the cart, and upwards as packages are removed from the cart.

19. The cart of claim 16, wherein an angle between the first floor portion and the second floor portion changes as the drive system drives the scissor mechanism.

20. The cart of claim 16, further comprising:
a first sensor configured to detect a first fullness level of the cart; and
a second sensor configured to detect a second fullness level of the cart;
wherein the drive system is configured to position the scissor mechanism at a first position responsive to a first signal from the first sensor, and at a second position responsive to a second signal from the second sensor.

* * * * *